United States Patent
Laicher et al.

(10) Patent No.: US 9,639,439 B2
(45) Date of Patent: May 2, 2017

(54) DISASTER RECOVERY FRAMEWORK FOR CLOUD DELIVERY

(71) Applicants: Karolin Laicher, Bruchsal (DE); Stephan Heusch, Berlin (DE)

(72) Inventors: Karolin Laicher, Bruchsal (DE); Stephan Heusch, Berlin (DE)

(73) Assignee: SAP SE, Walldorf (DE)

( * ) Notice: Subject to any disclaimer, the term of this patent is extended or adjusted under 35 U.S.C. 154(b) by 125 days.

(21) Appl. No.: 14/686,464

(22) Filed: Apr. 14, 2015

(65) Prior Publication Data
US 2016/0306719 A1  Oct. 20, 2016

(51) Int. Cl.
*G06F 11/00* (2006.01)
*G06F 11/20* (2006.01)
*G06F 11/14* (2006.01)
*H04L 29/08* (2006.01)

(52) U.S. Cl.
CPC ........ *G06F 11/203* (2013.01); *G06F 11/1471* (2013.01); *G06F 11/2069* (2013.01); *H04L 67/1095* (2013.01); *G06F 2201/80* (2013.01); *G06F 2201/805* (2013.01)

(58) Field of Classification Search
CPC ............. G06F 9/45558; G06F 11/1464; G06F 11/2023; G06F 11/2094; G06F 11/2056; G06F 11/203
See application file for complete search history.

(56) References Cited

U.S. PATENT DOCUMENTS

| | | | |
|---|---|---|---|
| 6,697,960 B1* | 2/2004 | Clark | G06F 11/1474 714/15 |
| 2014/0181579 A1* | 6/2014 | Whitehead | G06F 17/30289 714/15 |
| 2015/0339200 A1* | 11/2015 | Madduri | G06F 11/2028 714/4.11 |
| 2016/0092314 A1* | 3/2016 | Crockett | G06F 11/2058 714/15 |

\* cited by examiner

*Primary Examiner* — Charles Ehne
(74) *Attorney, Agent, or Firm* — Schwegman Lundberg & Woessner, P.A.

(57) ABSTRACT

In an example embodiment, an instance of a first database and an instance of a first application in a first data center of a managed cloud are replicated to a second data center of the managed cloud. Then state information regarding the first application is stored in a network file system in the first data center. Interactions between a user and the first application are directed to the instance of the first application in the first data center. The state information is then updated based on the interactions, and any changes to the instance of the first database based on the interactions are replicated to the second data center. Then a disaster is detected in the first data center, and all interactions between the user and the first application are redirected to a second instance of the first application in the second data center caused by the replication of the instance of the first application in the first data center.

19 Claims, 18 Drawing Sheets

… (1) 
DISASTER RECOVERY FRAMEWORK FOR CLOUD DELIVERY

TECHNICAL FIELD

This document generally relates to methods and systems for use with computer networks and customer business solutions deployed in it. More particularly, this document relates to a disaster recovery framework for cloud delivery.

BACKGROUND

High availability and disaster recovery are key elements of a business continuity service. High availability protects against a single point of failure by introducing technical measures and related services that safeguard application continuity from a business perspective in case of occurrence of this single failure. The target is to ensure the maximum business continuity in the event of a failure by either avoiding, or at least minimizing, the unplanned outage.

Disaster recovery helps ensure that, in the event of a total failure of a particular data center, there remains the ability to ensure maximum business continuity by providing a secondary site. The target is to ensure the maximum business continuity in the case of a disaster recovery occurrence by introducing technical and organizational measures as well as procedures to allow recovery in the fastest possible timeframe of all the business functions that are vital to the customer. In contrast to high availability, disaster recovery is embedded in an overall disaster recovery plan that addresses and prepares not only the technical measures but also the organizational procedures for all involved parties.

BRIEF DESCRIPTION OF DRAWINGS

The present disclosure is illustrated by way of example and not limitation in the figures of the accompanying drawings.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, aspects are provided that describe a disaster recovery architecture framework that recognizes the optimal realization of a business continuity service. The disaster recovery architecture framework allows a standardized setup and delivery of disaster recovery for any product in a managed cloud delivery environment.

In an example embodiment, disaster recovery is achieved on the database level via replication mechanisms. For each database in a product, there is a dedicated server available in a second location hosting a replication target of the primary database which is the replication source. The replication target is continuously kept up to date by the replication source, regardless whether the source is setup as singleton or in a high availability setup. Thus in the case of a disaster affecting the database, the database at the second location is ready to take over.

In an example embodiment, disaster recovery is achieved on the application tier via storage replication. For each service in a product, there is a dedicated server available at a second location to perform the same service. Those two servers are peers together and any change applied on the server on the primary side is automatically mirrored to the second server on the disaster recovery side. Any application data not stored on the database side may be stored in a network file system. Asynchronous replication of the network file system may be performed continuously via, for example, storage mirroring technology. In the case of a disaster affecting the primary server, the server at the second location is in principle ready to provide the same services.

Central procedure orchestration may be performed using a landscape virtualization manager.

Customers may not wish to invest twice in both a high availability setup and a disaster recovery setup. In an example embodiment, the setups may be shared using the same hardware, considering the distance between the primary site and the secondary\site.

Figure 1:
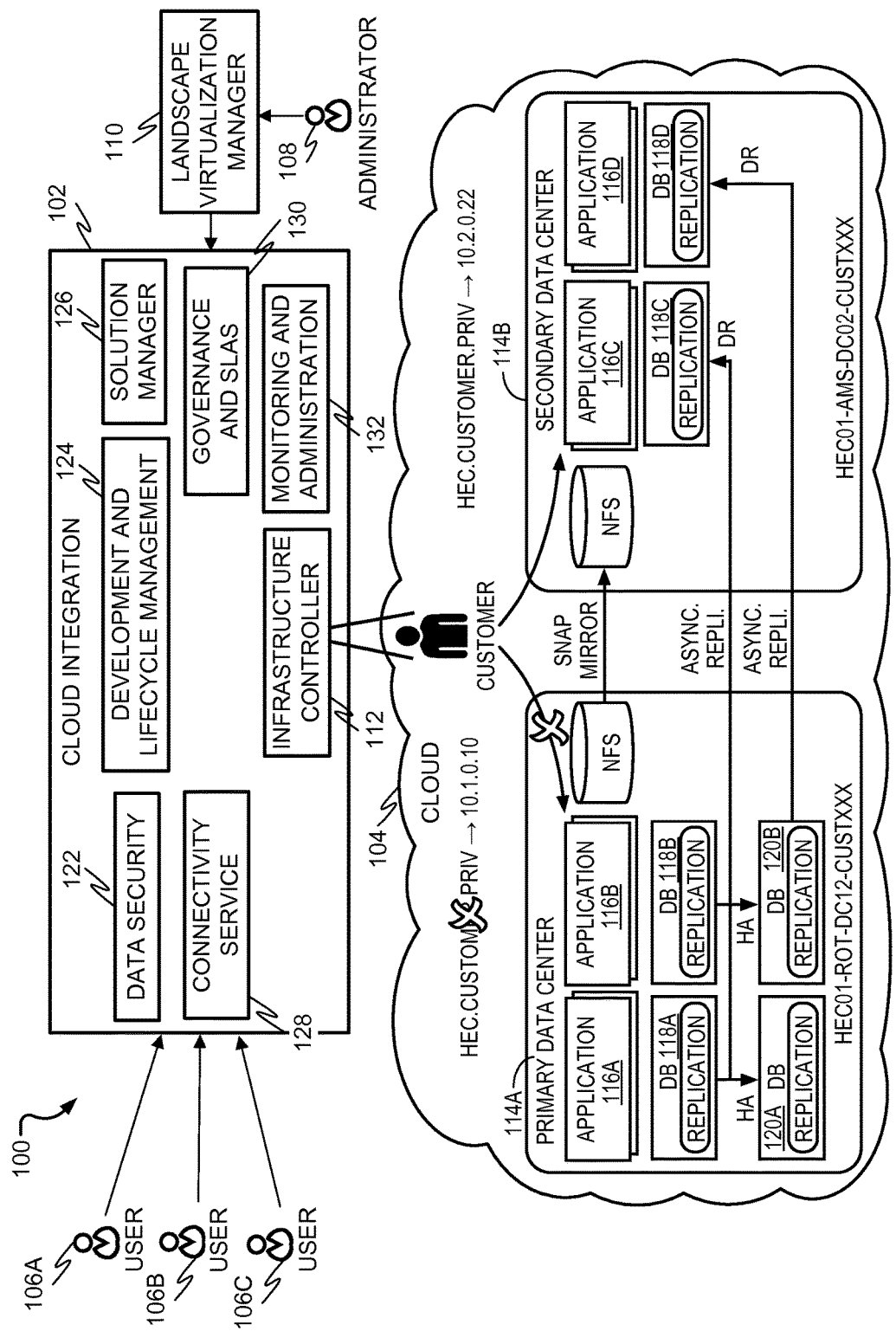
FIG. 1 is a block diagram illustrating a business system landscape deployed in a cloud, in accordance with an example embodiment.

FIG. 1 is a block diagram illustrating a business system landscape 100 deployed in a cloud, in accordance with an example embodiment. The business system landscape 100 comprises a cloud integration component 102 and a cloud 104, which is a customer specific cloud/network/landscape but can also be a public cloud. One or more users 106A, 106B, and 106C interact with the cloud 104 via their customer on-premise network which is an extension of the cloud network. An administrator 108 may setup, configure and then manage high availability and/or disaster recovery for the cloud 104 leveraging the landscape virtualization manager 110 for its central management. While the landscape virtualization manager is aware of all business application, the customer system landscape and the data center, it interacts with all infrastructure services related components such as network, storage and physical servers/hypervisor with the respective infrastructure management framework which is the technical infrastructure controller 112 102. The infrastructure controller 112 acts to manage the high availability and/or disaster recovery among two or more data centers (here a primary data center 114A and a secondary data center 114B) for all infrastructure specific services such as DNS management and storage management including mirroring. The primary data center 114A may comprise applications 116A and 116B, which interact with databases 118A and 118B. The secondary data center 114B may comprise applications 116C and 116D, which interact with databases 118C and 118D. The database 118A is replicated to the database 118C for disaster recovery purposes. Likewise, the database 118B is replicated to the database 118D for disaster recovery purposes. In an example embodiment, these replications are asynchronous but can also be synchronous depending on the distance between the primary and the secondary data center. The database 118A can also be replicated to a database 120A for high availability purposes. Likewise, the database 118B can be replicated to a database 120B for high-availability purposes.

The cloud integration component 102 may also comprise additional components other than the infrastructure controller 112. A data security component 122 may manage the data security of the cloud 104. A development and lifecycle management component 124 may manage the development, deployment, and updates for various applications in the cloud 104, including, for example, applications 116A-116D. A solution manager 126 may be positioned as a monitoring tool used for solution availability monitoring. A connectivity service 128 may manage connectivity between the users 106A-106C and the cloud 104. A governance and service level agreements (SLAs) component 130 may manage various rules and regulations for cloud data, including adherence to one or more SLAs. A monitoring and administration component 132 may monitor conditions in the cloud 104 and generate alerts, as well as providing an interface to the landscape virtualization manager 110 to allow the administrator 108 to alter conditions for the monitoring and/or alerts. All these management components refer to the primary side (which is by default the primary data center but may get failed over to the secondary data center in the case of a disaster). The disaster recovery architecture is able to foresee that all the central cloud managing entities while applied on the primary side are also then automatically or semi-automatically applied to the secondary side in order to ensure that the secondary side can become the primary side in the event of an disaster, in the fastest possible way.

Figure 2:
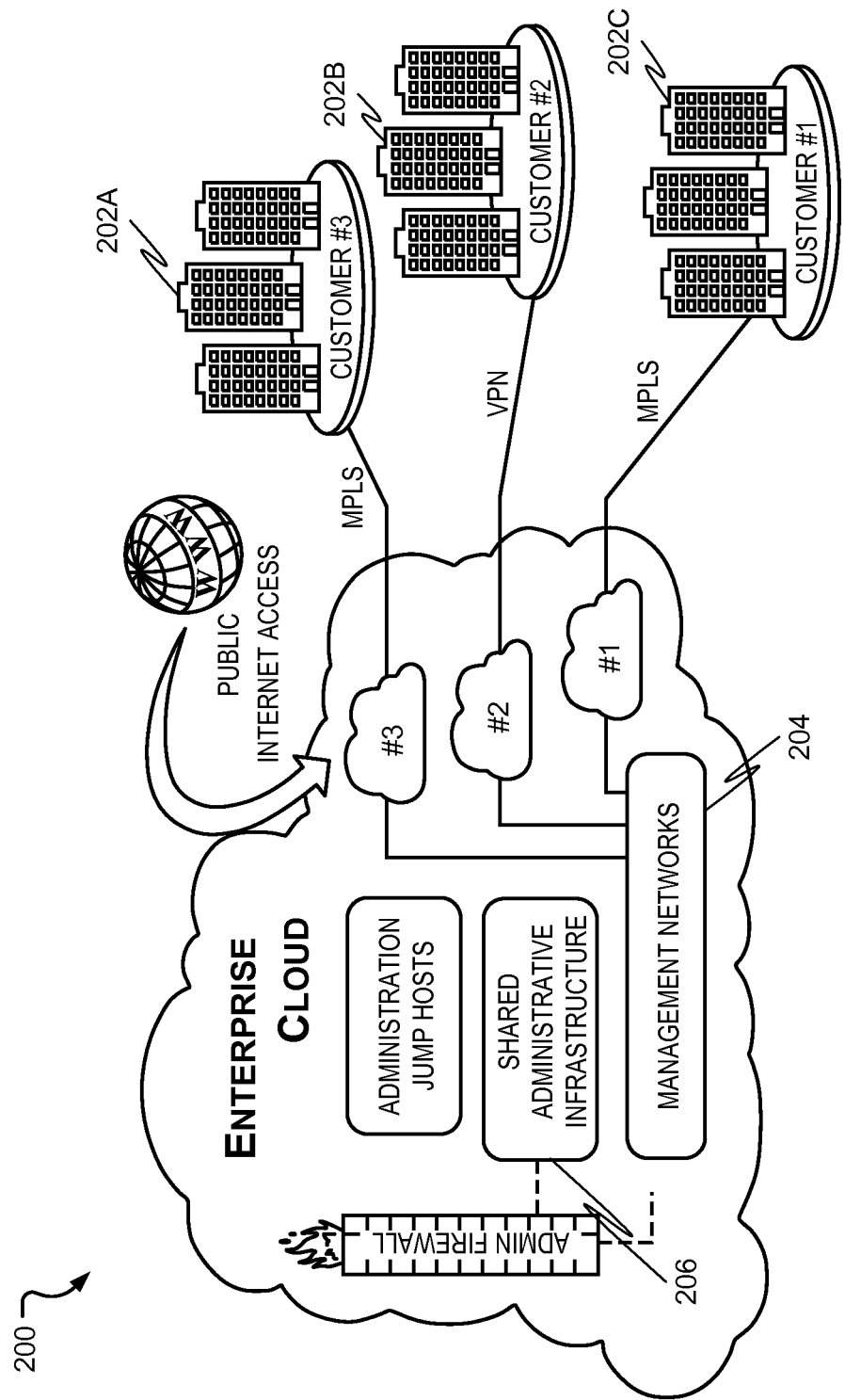
FIG. 2 is a block diagram illustrating a managed cloud delivery customer landscape system and its connection to a remaining on-premise deployment, in accordance with an example embodiment.

In order to understand the overall disaster recovery architecture it is useful to understand how customer landscapes are set up in a managed cloud. FIG. 2 is a block diagram illustrating a managed cloud delivery customer landscape system 200 and its connection to a remaining on-premise deployment, in accordance with an example embodiment. The managed cloud delivery customer landscape system 200 includes one or more customers 202A, 202B, and 202C, which may be businesses or other large organizations, as well as a managed cloud. Access from the customers 202A, 202B, and 202C is channeled through one or more management networks 204, which is an extension of the customer's on-premise network. The customer by this always only can access their network. On the other hand the cloud Service provider has to access all of this customer networks. This is done by establishing the communication server as the single entry point to the customer network from cloud management network side. There is virtually one management network that is physically separated in the different data center locations. This virtual one management network shares one virtual administrative infrastructure 206. The access control may be managed by, for example, a landscape virtualization manager, such as the landscape virtualization manager 110 of FIG. 1. While high availability shall be realized from within a single customer network 204, in an example embodiment, disaster recovery (as well as an extension of disaster recovery is realized using a dedicated additional customer network 204, each having its own data-center specific domain. Thus while each network domain contains the data center specific appendix, the domain used by the customer is cross-data center and thus data center domain independent. In the event of an disaster, the URLs towards customer remain stable while the mapping of the customer facing URL to the data center specific domain is done via respective DNS management.

Figure 3:
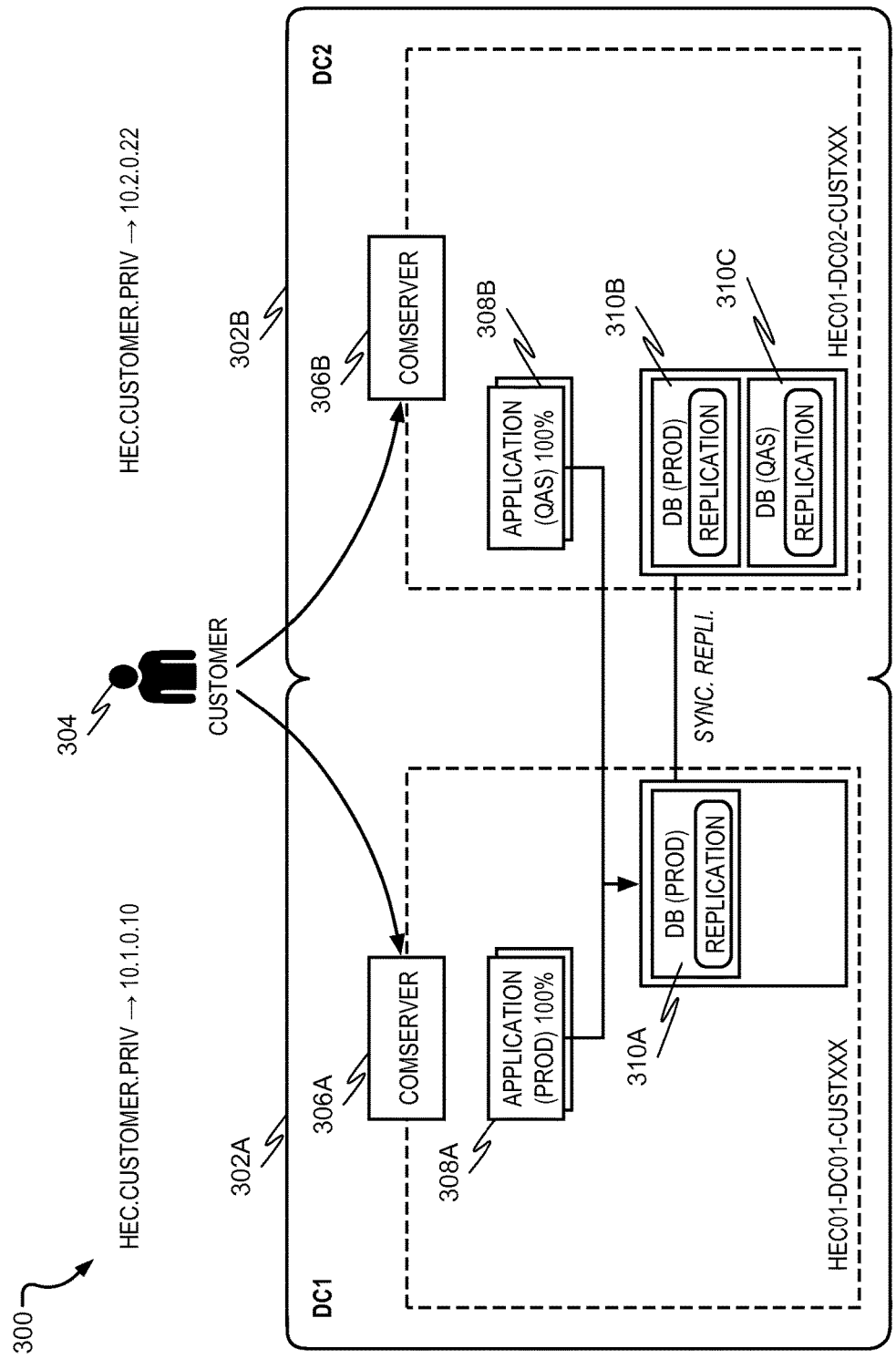
FIG. 3 is a block diagram illustrating a system containing a primary and disaster recovery management networks, in accordance with an example embodiment.

FIG. 3 is a block diagram illustrating a system 300 containing a primary 302A and disaster 302B recovery management networks, in accordance with an example embodiment. Here, a customer 304 may communicate with either a data center specific customer network domain 306B or a data center specific customer network domain 306A, depending on whether or not a disaster has occurred affecting an application 308A, 308B, or affecting a database 310A, 310B, in the other management network 302A, 302B, respectively. Also pictured is a database 310C, which is used for high availability purposes solely in the management network 302B.

Each management network 302A, 302B could be thought of as a different data center, perhaps located in a geographically distant location from the other data center. Each data center and hence each management network 302A, 302B may be assigned its own domain. In order to derive the domain, in an example embodiment respective master data is modeled, available, and retrievable from respective services and considered in the respective operations entities such as the DNS management. Network creation may be initiated by, for example, the infrastructure controller 112 of FIG. 1. All relevant information may be stored by the infrastructure controller 112.

In cases where the systems (e.g., application servers) are distributed equally between multiple management networks 302A, 302B and accessible in parallel for customer usage, the domain of each management network 302A, 302B is different.

Figure 4:
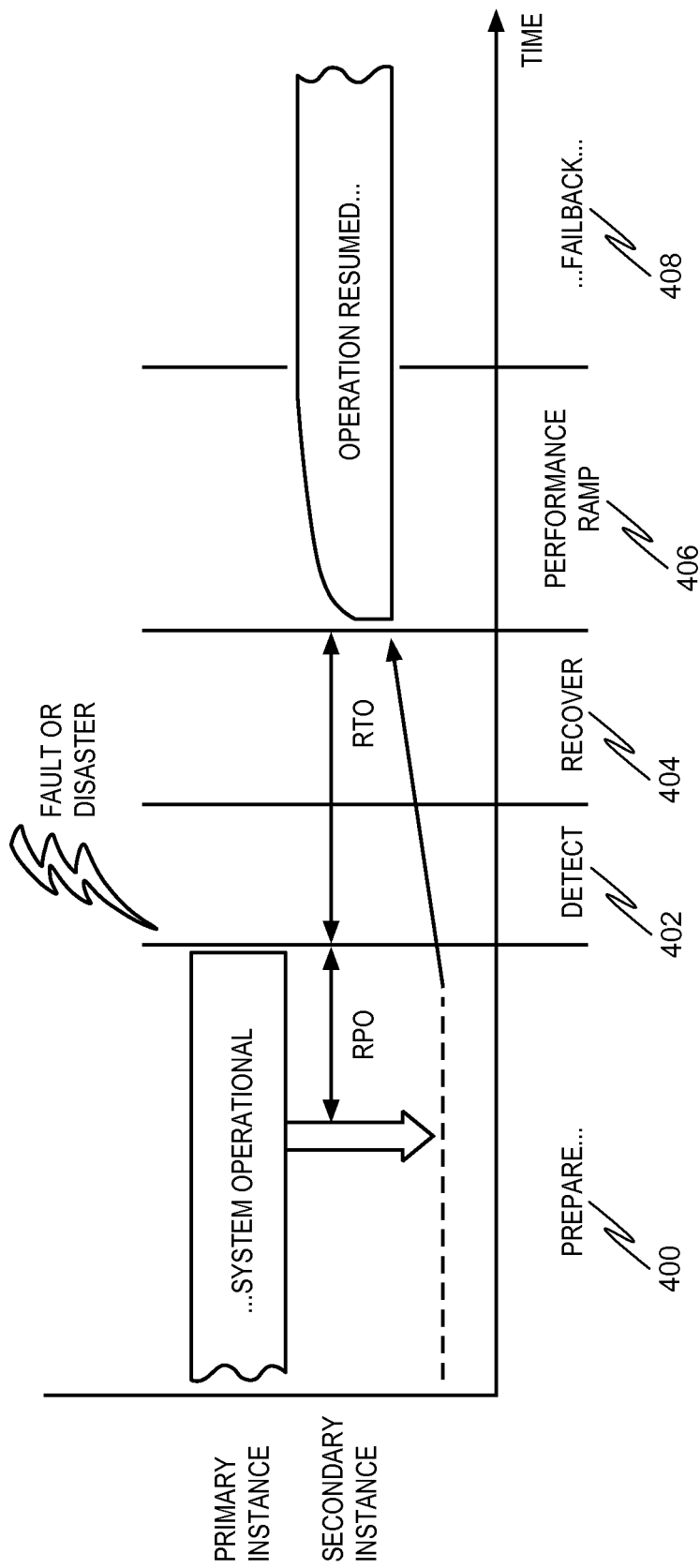
FIG. 4 is a diagram illustrating the operations phases of high availability, in accordance with an example embodiment.

In an example embodiment, for end-to-end disaster recovery, five phases maybe implemented. In the context of the failover (real disaster) the key performance indicators (KPIs) of recovery point objective (RPO) and recovery time objective (RTO) determine the overall service quality FIG. 4 is a diagram illustrating the operations phases of high availability, in accordance with an example embodiment. These phases include a prepare phase 400, a detect phase 402, a recover phase 404, a ramp-up phase (or performance ramp) 406, and a failback phase 408. In the prepare phase 400, actions may be undertaken to prepare a network for the disaster recover setup. These actions may be designed based on the business objective for data loss (e.g., recovery point objective) and the business objective for the time to recover from a single failure (e.g., recovery time objective). This may include setting up both databases and applications according to the disaster recovery architecture in separate networks. In an example embodiment, this setup may be performed by one or more automation scripts, in order to achieve high standardization. In an example embodiment, the setup may include replicating databases and/or applications onto different servers within the network, as well as establishing formalized procedures for synchronizing the databases in replication mode (e.g., replicate when a change occurs) as well as the applications leveraging storage mirroring and applications (replicate at a periodic rate, etc.). Aspects of this replication will be described in more detail below.

In the detect phase 402, a standard monitoring operations architecture is altered to include specialized monitoring of all systems relevant for high availability, as defined by the customer. Alerts may be established that clearly outline the current issue and data needs as well as defining the proper problem resolution. Additionally, the alerts may define the impact to service quality, such as SLA violations due to unplanned unavailability.

In an example embodiment, managed cloud delivery primary database instances are continuously monitored, but this standard monitoring is enhanced to check the state and the replication status of the secondary (replication target database(s)) instance for high availability setup as well as disaster recovery setup. This helps to ensure that the secondary instance is always in the desired state and ready to take over whenever a failure occurs. Monitoring of availability metrics can also be performed on the application side. Depending on the kind of failure, the issue can be captured either by the redundant service (e.g., dialog instance) or by the explicitly triggered failover (e.g., central services) for high availability. For disaster recovery, an outage affecting more than one single entities is occurring. Also in this case monitoring would detect this, but in contrast of restoring the single service a failover to the disaster recovery side would be initiated.

In the recover phase 404, an automated process may be executed by leveraging as much as possible the adaptive computing principles and functionality embedded into the landscape virtualization manager 110 of FIG. 1 as well as additional cloud automation principles to allow a failover transparent of the customer with the fulfillment of the relevant service KPIs in regards to Recovery Point Objective and Recovery Time Objective. As will be described in more detail below, for in-memory databases additional in-memory database-specific automation content may be put in place to achieve the same level of automation for all different components on the database and application levels.

In the ramp-up phase 406, the objective is to keep the ramp-up of the secondary instance as short as possible to allow business operations to run as much as possible with minimal interruption. In an example embodiment, the ramp-up phase 406 may be integrated into a proactive monitoring approach to achieve both a controlled recovery procedure and reference data for further optimization of recovery speed in the future.

In the failback phase 408, after successful recovery, the objective is to ensure that resilience is added again to prepare for the next possible failure. Rebuilding of the high availability setup for all affected entities is targeted to be done according to database/application specifics. Clear guidelines can be provided on how to perform this setup.

Figure 5:
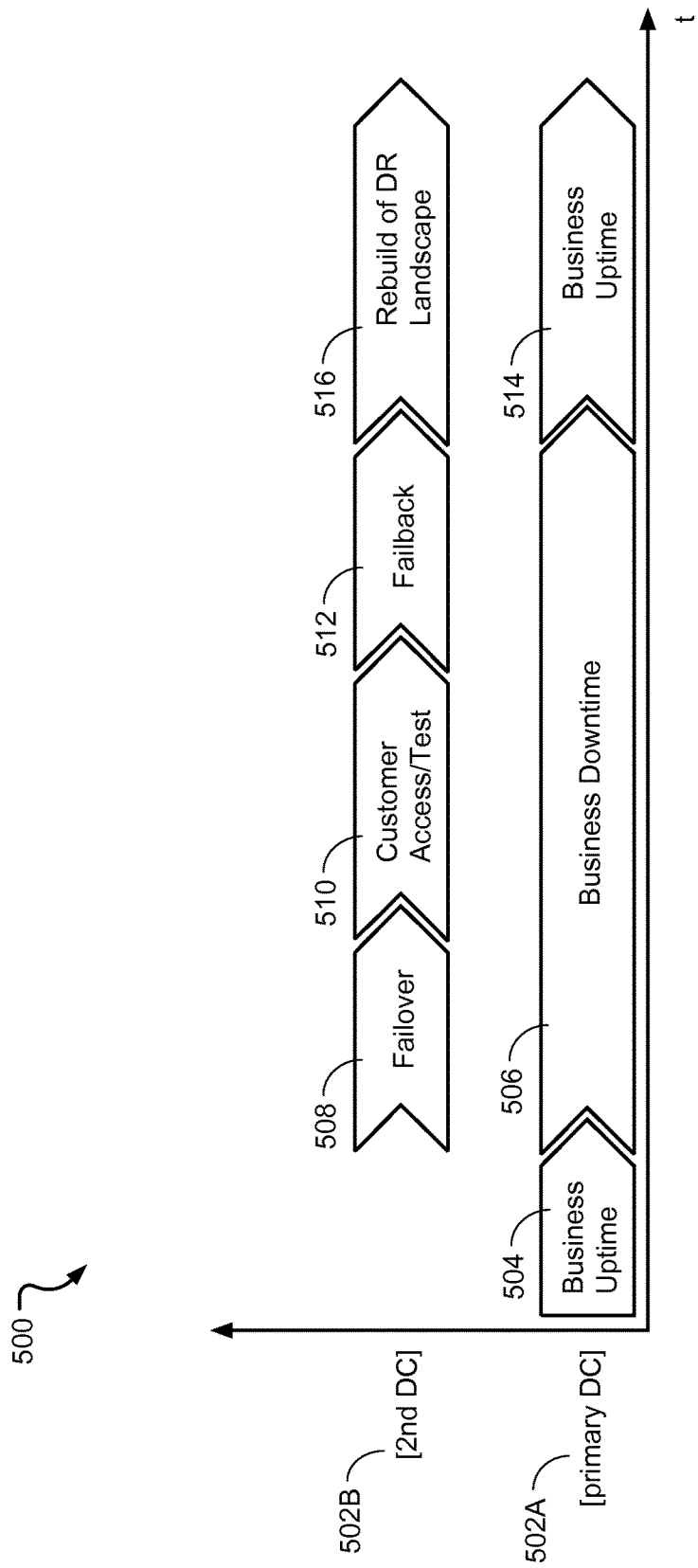
FIG. 5 is a diagram illustrating a disaster recovery end-to-end procedure in accordance with an example embodiment.

FIG. 5 is a diagram illustrating a disaster recovery end-to-end procedure 500 in accordance with an example embodiment. Here, a primary data center 502A runs normal business operations during business uptime 504. When this transitions to business downtime 506, a failover 508 to the secondary data center 502B occurs. Then customer access and tests 510 can be performed, followed by a failback 512 to the primary data center 502B, which then runs business uptime 514 again. During this business uptime 514, the secondary data center 502B can perform a rebuild 516 of the disaster recovery landscape.

High availability on the database level is achieved via replication mechanisms. For in-memory database environments, this means the setup and configuration of synchronous in-memory database system replication in the case of a single-node deployment and the addition of a dedicated standby server in the case of a multi-node deployment. For other databases, this means the setup and configuration of replication leveraging a system replication solution (SRS). In both scenarios, the respective standby server is continuously updated by the primary instance to ensure that in the case of a failure the standby server can take over any time the failover procedure has been invoked.

In an example embodiment, high availability at the application tier is achieved via a redundancy layer. For each of the services, at least one redundant server is set up. The redundant services are provisioned on a separate hypervisor, so that in case one hypervisor fails, the services deployed on the second hypervisor are still available. Depending on the application-specific requirements, stored data in a file system repository is shared between those services and therefore kept up to date. In the case of failure of one of the services, the secondary redundant service resumes the productive role, so from an end-user perspective no change is visible, with new requests being performed by the secondary redundant service. In the case where an application has its own application-specific features that are assigned statically to one service, additional measures can be introduced to assign such features automatically to the secondary redundant service.

As to the disaster recovery, in contrast to the system landscape on the primary side, the main target for the disaster recovery setup is to keep it in sync with the productively used customer landscape (e.g. system configured in the respective disaster recovery scenario), not just in terms of system setup but also in terms of any configuration and operation performed by the customer. Hence, it is useful for the respective application's configuration information to be stored on the database level.

In an optimal setup, the disaster recovery landscape does not require any additional effort, as monitoring only becomes relevant at the time of permanent failover and any other maintenance and operations activity is performed via the primary system and the respective mirroring to the disaster recovery side. In instances where it is useful to log on to the disaster recovery side, such as applying database patches, this may be kept to a minimum.

The phases of the end-to-end high availability operational procedure applied above can also be applied to the disaster recovery setup. The main difference applies infrastructure-wise in a separated dedicated customer network setup and operation-wise in a more complex procedure (because instead of a single failure, a disaster implies a major outage of multiple systems/landscapes), and thus different SLAs in particular.

In an example embodiment, the wide area network (WAN) connectivity to the cloud integration/cloud components is the responsibility of the customer. The customer has an independent network connection to each management network (e.g., data center). Each management network shall utilize a different range of network addresses. A failover event within an in-network database environment usually only results in DNS changes, and therefore any customer-specific DNS sub-domain should be delegated to the in-network database. Each management network gets its own site-specific DNS sub-domain.

Disaster recovery on the database level is achieved via replication mechanisms. For each of the databases, there is a dedicated server available in the secondary management network. The database in the secondary management network is connected with the database in the primary management network using a supported replication mechanism.

Disaster recovery on the application tier is achieved via storage replication. For each of the services there is a dedicated server available in the secondary management network. Any application data not stored on the database side can be stored in an NFS/storage volume. Asynchronous replication of the NFS/storage volume can then be performed via mirroring technology. In the case of a disaster, the services on the secondary management network are ready to take over.

In order to ensure high standardization and automation, it is useful if there is clear orchestration of the tools. Referring back to FIG. 1, the infrastructure controller 112 may control the infrastructure as a service layer and is therefore responsible for the server/storage/network provisioning and management. The infrastructure controller 112 may also own the respective master data used to map the business applications of a particular customer to respective hardware and network resources.

The landscape virtualization manager 110 may provide basic availability monitoring on the system level and is the central tool for any system management-related activity. The landscape virtualization manager 110 is also the main orchestration framework when it comes to the automatic setup of systems, instrumentation for monitoring, and automation of failover procedures. The landscape virtualization manager 110 may provide instructions to the infrastructure controller 112 as to how to react to the detection of a disaster. Specifically, the instructions may include instructions on attempting to restart the applications in the first data center after a disaster occurs, and these instructions may vary depending on the type of alert detected by the solution manager 126.

The solution manager 126 may be positioned as a monitoring tool used for solution availability and system monitoring. The collected availability monitoring data is used for generating alerts but also as a basis for service quality reporting in regards to SLA compliance such as maximal allowed RTO/month=SLA/month.

As described earlier, in an example embodiment, disaster recovery is utilized in an in-memory database environment. A general implementation of an in-memory database will now be described prior to additional details being provided of how the disaster recovery aspects may be extended into the in-memory database environment.

Figure 6:
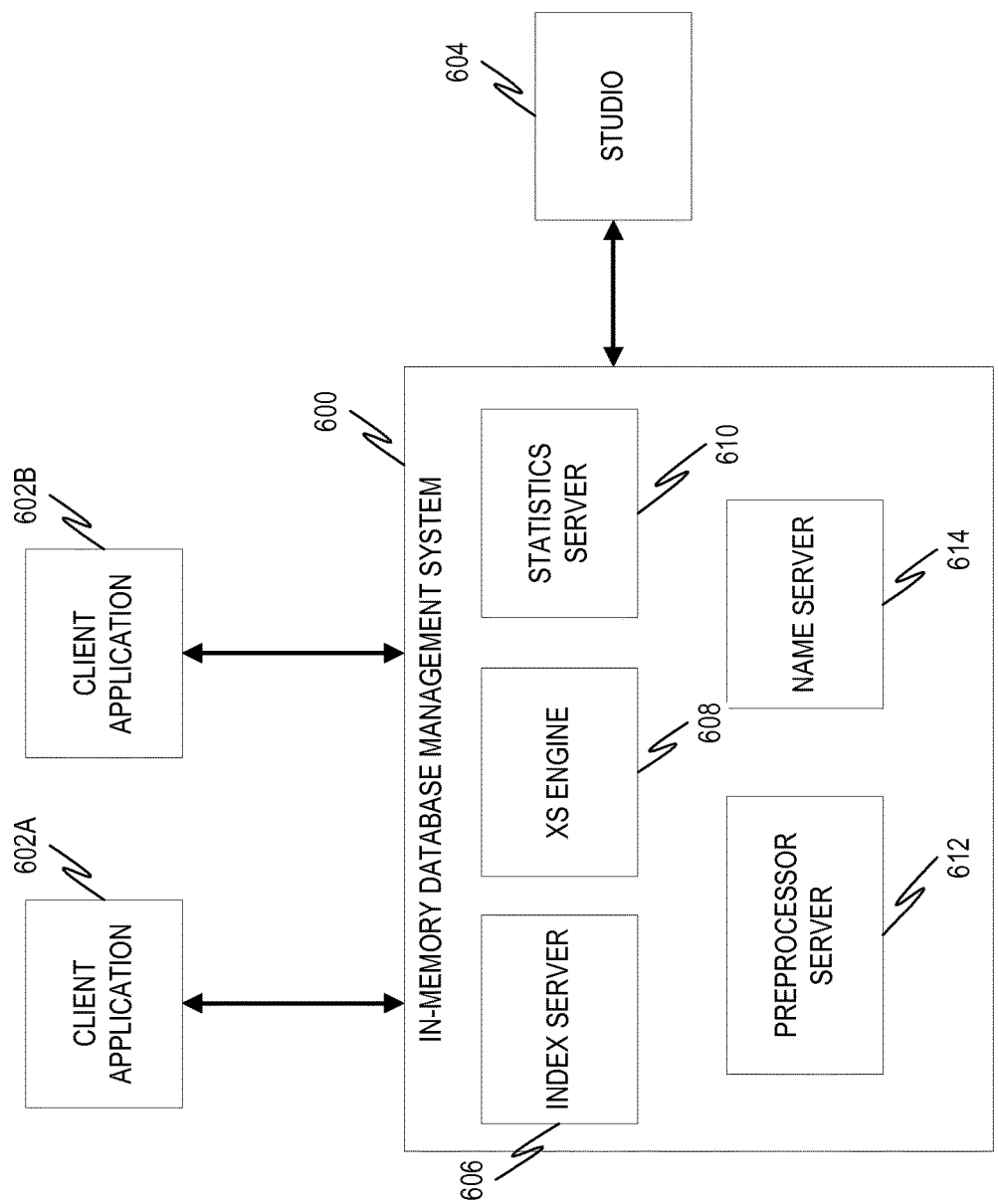
FIG. 6 is a diagram illustrating an in-memory database management system, including its client/external connection points, which can be kept stable in the case of disaster recovery to ensure stable service operations, in accordance with an example embodiment.

FIG. 6 is a diagram illustrating an in-memory database management system 600, including its client/external connection points, which can be kept stable in the case of disaster recovery to ensure stable service operations, in accordance with an example embodiment. Here, the in-memory database management system 600 may be coupled to one or more client applications 602A, 602B. The client applications 602A, 602B may communicate with the in-memory database management system 600 through a number of different protocols, including Structured Query Language (SQL), Multidimensional Expressions (MDX), Hypertext Transfer Protocol (HTTP), Representational State Transfer (REST), and Hypertext Markup Language (HTML).

Also depicted is a studio 604, used to perform modeling or basic database access and operations management by accessing the in-memory database management system 600.

The in-memory database management system 600 may comprise a number of different components, including an index server 606, an XS engine 608, a statistics server 610, a preprocessor server 612, and a name server 614. These components may operate on a single computing device, or may be spread among multiple computing devices (e.g., separate servers).

The index server 606 contains the actual data and the engines for processing the data. It also coordinates and uses all the other servers.

The XS engine 608 allows clients to connect to the system 100 using web protocols, such as HTTP.

The statistics server 610 collects information about status, performance, and resource consumption from all the other server components. The statistics server 610 can be accessed from the studio 604 to obtain the status of various alert monitors.

The preprocessor server 612 is used for analyzing text data and extracting the information on which text search capabilities are based.

The name server 614 holds information about the database topology. This is used in a distributed system with instances of the database on different hosts. The name server 614 knows where the components are running and which data is located on which server.

Figure 7:
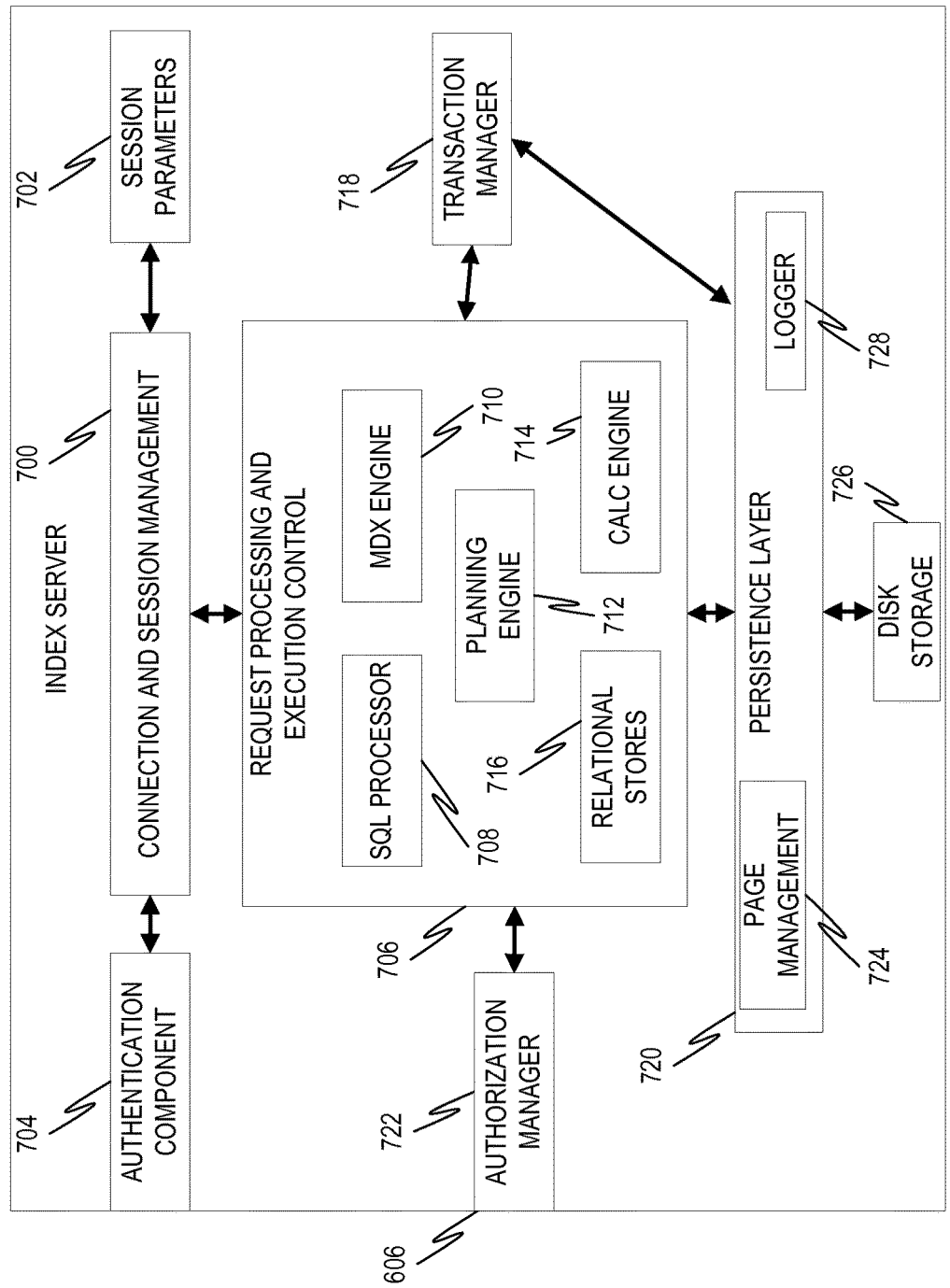
FIG. 7 is a diagram illustrating an index server in accordance with an example embodiment.

FIG. 7 is a diagram illustrating an index server 606 in accordance with an example embodiment. Specifically, the index server 606 of FIG. 6 is depicted in more detail. The index server 606 includes a connection and session management component 700, which is responsible for creating and managing sessions and connections for the database clients. Once a session is established, clients can communicate with the database system using SQL statements. For each session, a set of session parameters 702 may be maintained, such as auto-commit, current transaction isolation level, etc. Users (e.g., system administrators, developers) may be authenticated by the database system itself (e.g., by logging in with user name and password, using an authentication component 704) or authentication can be delegated to an external authentication provider such as a Lightweight Directory Access Protocol (LDAP) directory.

The client requests can be analyzed and executed by a set of components summarized as request processing and execution control 706. An SQL processor 708 checks the syntax and semantics of the client SQL statements and generates a logical execution plan. Multidimensional expressions (MDX) are a language for querying and manipulating multidimensional data stored in online analytical processing (OLAP) cubes. As such, an MDX engine 710 is provided to allow for the parsing and executing of MDX commands. A planning engine 712 allows applications (e.g., financial planning applications) to execute basic planning operations in the database layer. One such operation is to create a new version of a dataset as a copy of an existing dataset, while applying filters and transformations.

A calc engine 714 implements the various SQL script and planning operations. The calc engine 714 creates a logical execution plan for calculation models derived from SQL scripts, MDX, planning, and domain-specific models. This logical execution plan may include, for example, breaking up a model into operations that can be processed in parallel.

The data is stored in relational stores 716, which implement a relational database in main memory.

Each SQL statement may be processed in the context of a transaction. New sessions are implicitly assigned to a new transaction. A transaction manager 718 coordinates database transactions, controls transactional isolation, and keeps track of running and closed transactions. When a transaction is committed or rolled back, the transaction manager 718 informs the involved engines about this event so they can execute needed actions. The transaction manager 718 also cooperates with a persistence layer 720 to achieve atomic and durable transactions.

An authorization manager 722 is invoked by other database system components to check whether the user has the specified privileges to execute the requested operations. The database system allows for the granting of privileges to users or roles. A privilege grants the right to perform a specified operation on a specified object.

The persistence layer 720 ensures that the database is restored to the most recent committed state after a restart and that transactions are either completely executed or completely undone. To achieve this goal in an efficient way, the persistence layer 720 uses a combination of write-ahead logs, shadow paging, and save points. The persistence layer 720 also offers a page management interface 724 for writing and reading data to a separate disk storage 726, and also contains a logger 728 that manages the transaction log. Log entries can be written implicitly by the persistence layer 720 when data is written via the persistence interface or explicitly by using a log interface.

Figure 8:
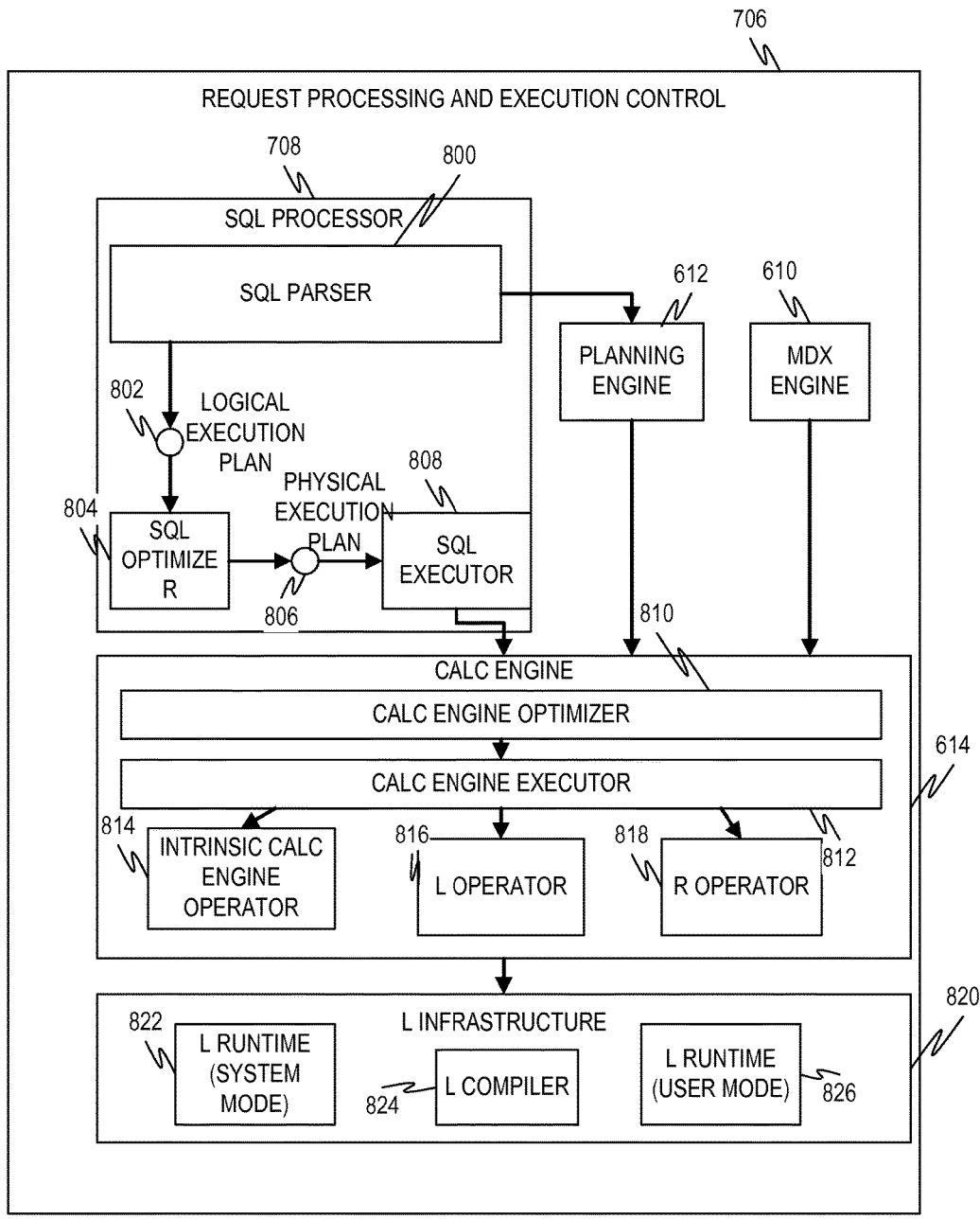
FIG. 8 is a diagram illustrating a request processing and execution control in accordance with an example embodiment.

FIG. 8 is a diagram illustrating a request processing and execution control 706 in accordance with an example embodiment. This diagram depicts the request processing and execution control 706 of FIG. 7 in more detail. The SQL processor 708 contains an SQL Parser 800, which parses an SQL statement and generates a logical execution plan 802, which it passes to an SQL optimizer 804. The SQL optimizer 804 then optimizes the logical execution plan 802 and converts it to a physical execution plan 806, which it then passes to an SQL executor 808. The calc engine 814 implements the various SQL script and planning operations, and includes a calc engine optimizer 810, which optimizes the operations, a calc engine executor 812, which executes the operations, as well as an intrinsic calc engine operator 814, an L operator 816, and an R operator 818.

An L infrastructure 820 includes a number of components to aid in the running of L procedures, including an L-runtime (system mode) 822, an L compiler 824, and an L-runtime (user mode) 826.

Figure 9:
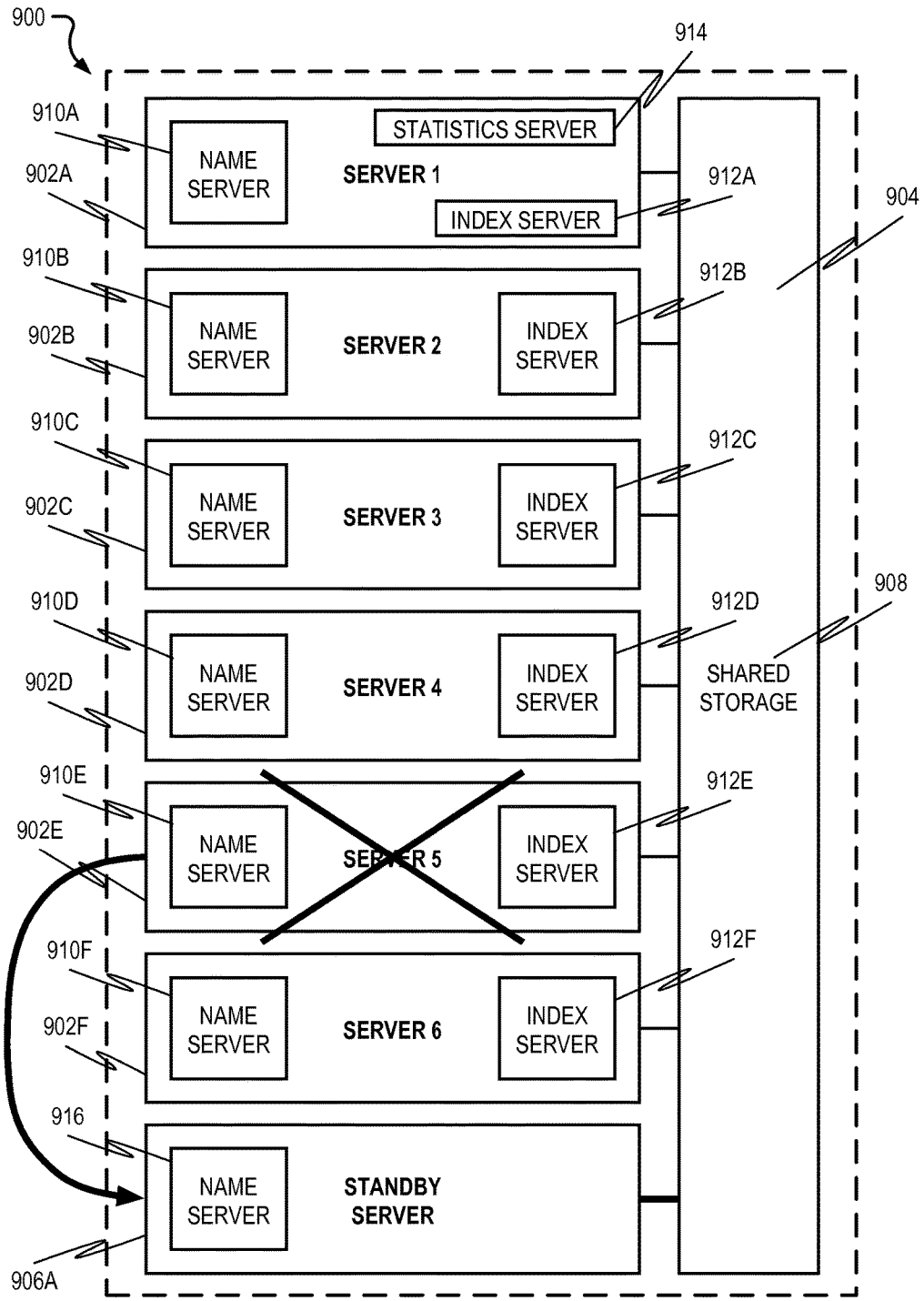
FIG. 9 is a block diagram illustrating a system for providing high availability in an in-memory database platform, in accordance with an example embodiment.

Turning now to the details of high availability and disaster recovery within an in-memory database, high availability within an in-memory database scale-out cluster can be achieved by adding additional standby servers. At the point of failure of one server, the standby server takes over. This takeover handling can be embedded into the in-memory database platform application and initiated automatically without any manual intervention. FIG. 9 is a block diagram illustrating a system 900 for providing high availability in an in-memory database platform, in accordance with an example embodiment. Here, there are one or more active servers 902A-902F in a cluster 904, in addition to one or more standby servers 906A. A shared file system 908 is provided for all servers in the cluster 904. All of the active servers 902A-902F may contain at least a name server 910A-910F and an index server 912A-912F. A statistics server 914 is contained on only one active server, here the active server 902A. A name server 916 is contained on the standby server 906A. When a particular active server, such as the active server 902E, fails, the first available standby server 906A reads indexes from the shared file system 908 and connects to a logical connection of the failed active server 902E.

The shared file system 908 is useful to allow the synchronization of the data and log files between the different active server 902A-902F and standby servers 906A within the cluster 904. In an example embodiment, the General Parallel File System (GPFS) is utilized to achieve synchronization.

Figure 10:
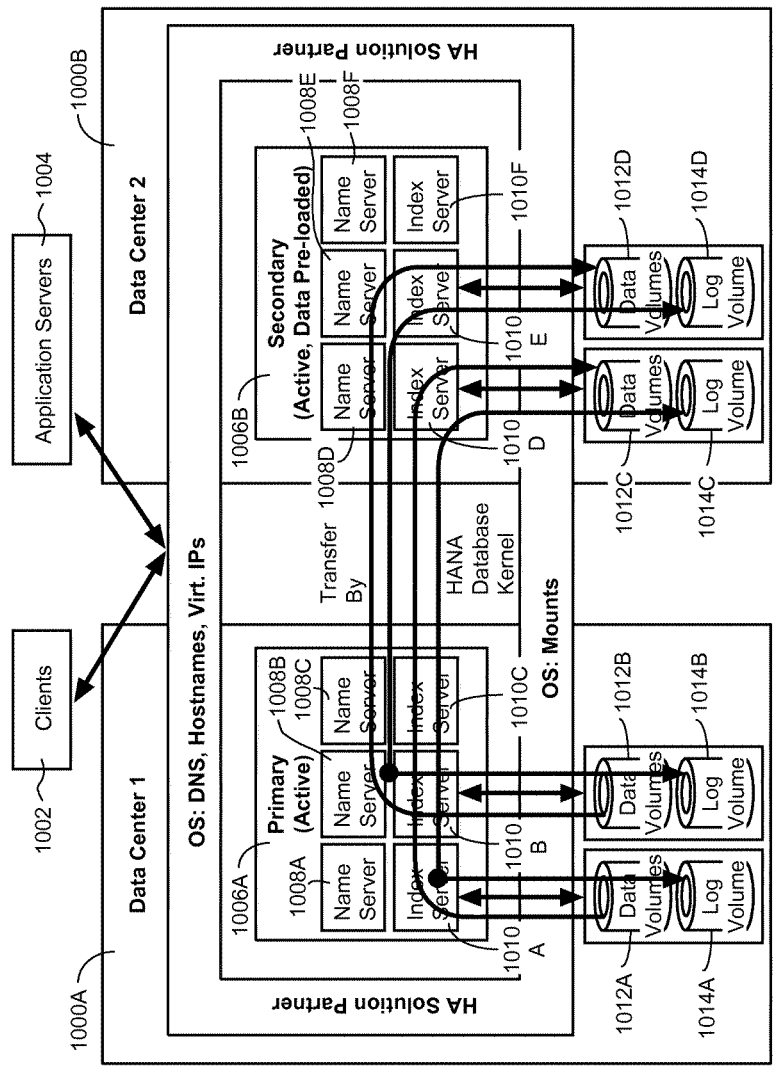
FIG. 10 is a block diagram illustrating a replication setup in accordance with an example embodiment.

FIG. 10 is a block diagram illustrating a replication setup in accordance with an example embodiment. Here, a first data center 1000A and a second data center 1000B can both be accessed by clients 1002 and application server(s) 1004. The first data center 1000A hosts a primary partition 1006A while the second data center 1000B hosts a secondary partition 1006B. Both the primary partition 1006A and the secondary partition 1006B host name servers 1008A-1008F and index servers 1010A-1010F. The index servers 1010A-1010F may be backed up to, for example data volumes 1012A-1012D and log volumes 1014A-1014D. The data volumes 1012A-1012D and log volumes 1014A-1014D may also be replicated to each other via a HANA database kernel.

Figure 11:
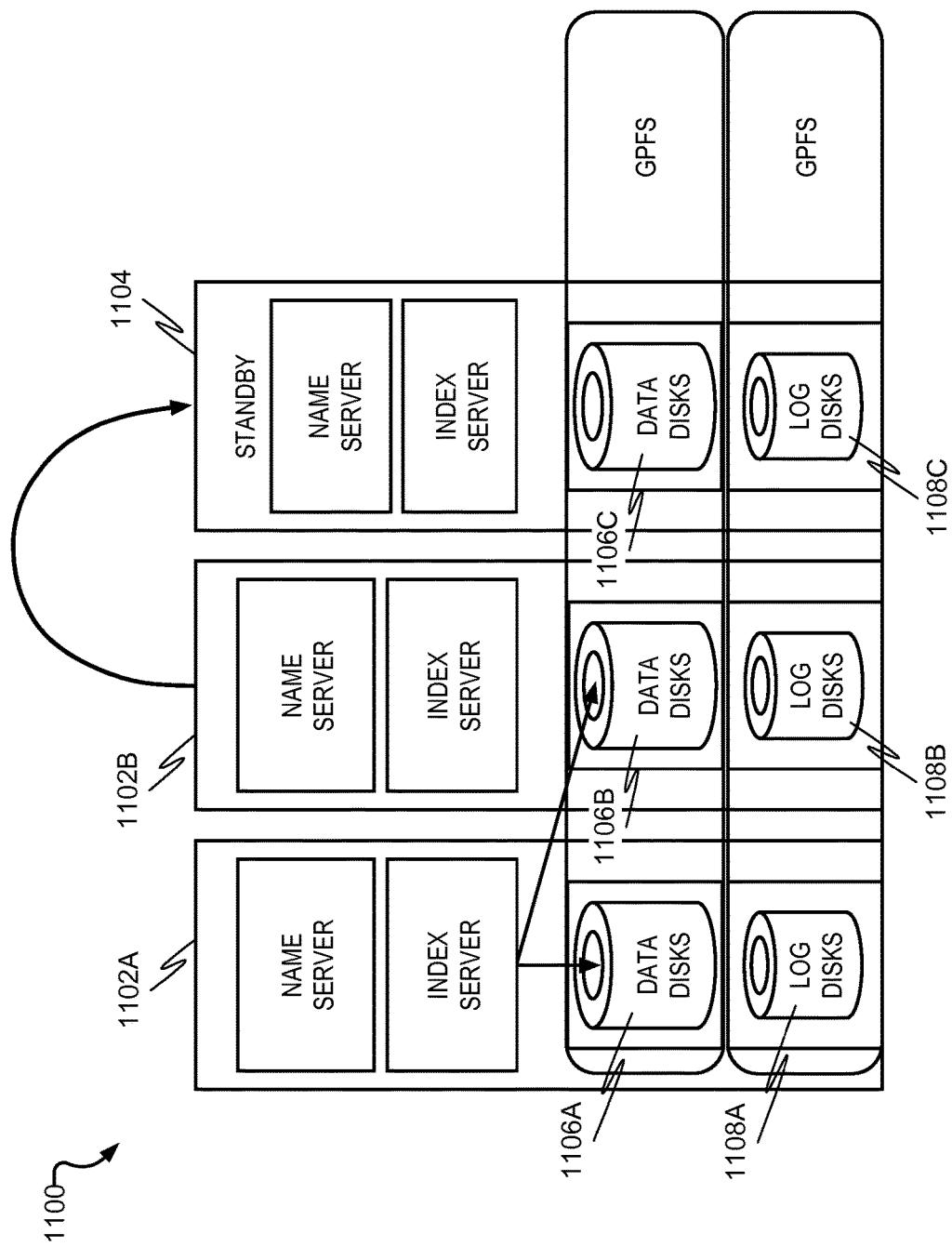
FIG. 11 is a block diagram illustrating a system utilizing GPFS, in accordance with an example embodiment.

FIG. 11 is a block diagram illustrating a system 1100 utilizing GPFS, in accordance with an example embodiment. Here, two active servers 1102A, 1102B and one standby server 1104 are depicted. GPFS crosses all the active servers 1102A, 1102B and the standby server 1104 to synchronize data disks 1106A, 1106B, 1106C and log disks 1108A, 1108B, 1108C among them.

Figure 12:
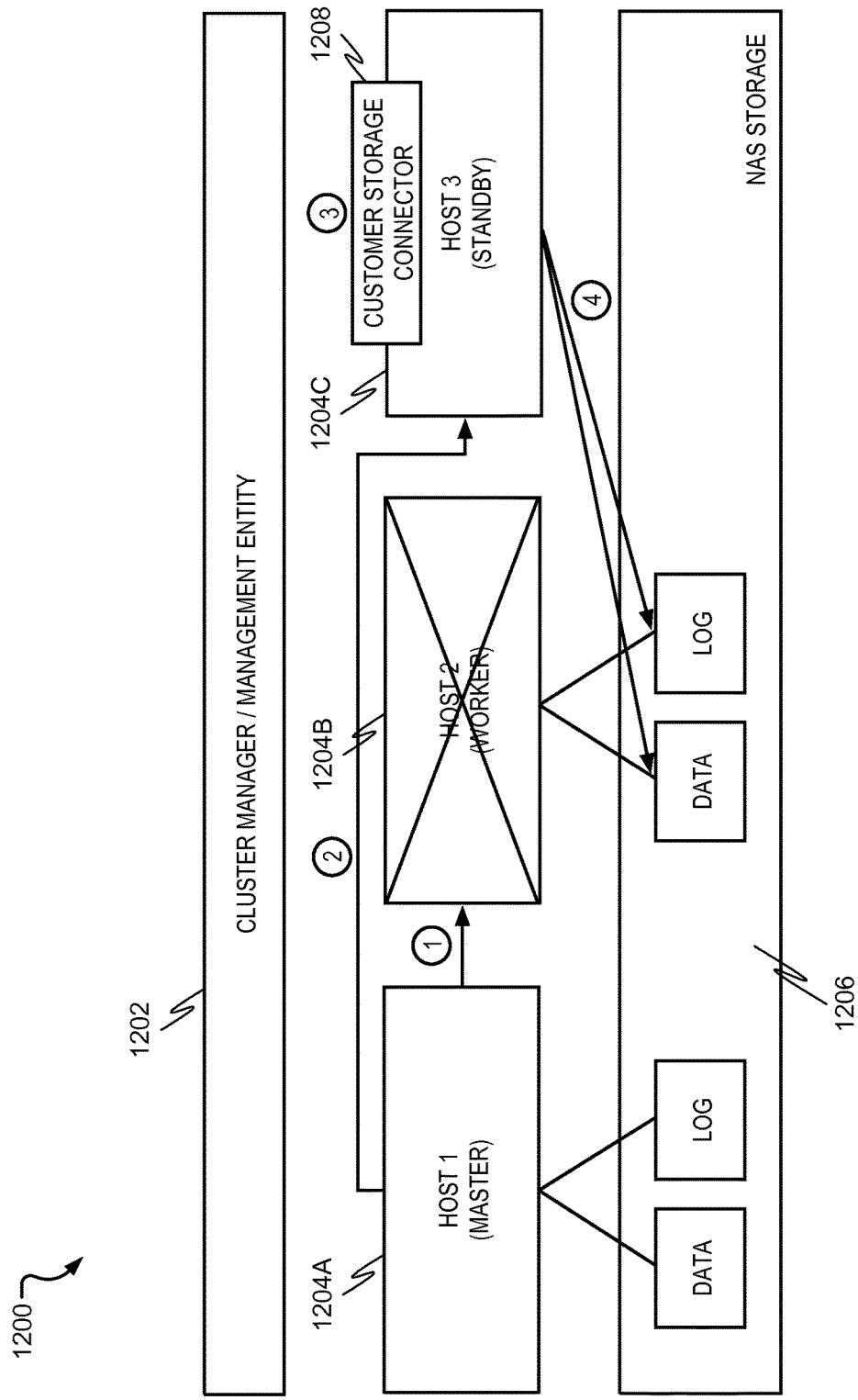
FIG. 12 is a block diagram illustrating a system utilizing an NFS-based shared storage mirroring solution, in accordance with an example embodiment.

In an example embodiment, instead of GPFS, a Network File System (NFS)-based shared storage mirroring solution is utilized. FIG. 12 is a block diagram illustrating a system 1200 utilizing an NFS-based shared storage mirroring solution, in accordance with an example embodiment.

The system 1200 includes a cluster manager/management entity 1202 and a plurality of hosts, labeled master host 1204A, worker host 1204B, and standby host 1204C, as well as a network attached storage (NAS) 1206. In this scenario, assume that the worker host 1204B has failed. The take-over procedure would work as follows. First, the master host 1204A may ping the worker host 1204B repeatedly and not receive an answer within a certain timeout period. Then, the master host 1204A decides that the standby host 1204C should take over the worker host's 1204B role and triggers the failover. The standby host 1204C then calls a custom storage connector 1208 with the hostname of the worker host 1204B as the parameter. The custom storage connector 1208 sends a power cycle request to the cluster manager/management entity 1202, which in turn triggers a power cycle command to the worker host 1204B. Once the custom storage connector 1208 returns without error, the standby host 1204C acquires the persistence of the worker host 1204B from the NAS 1206.

Figure 13:
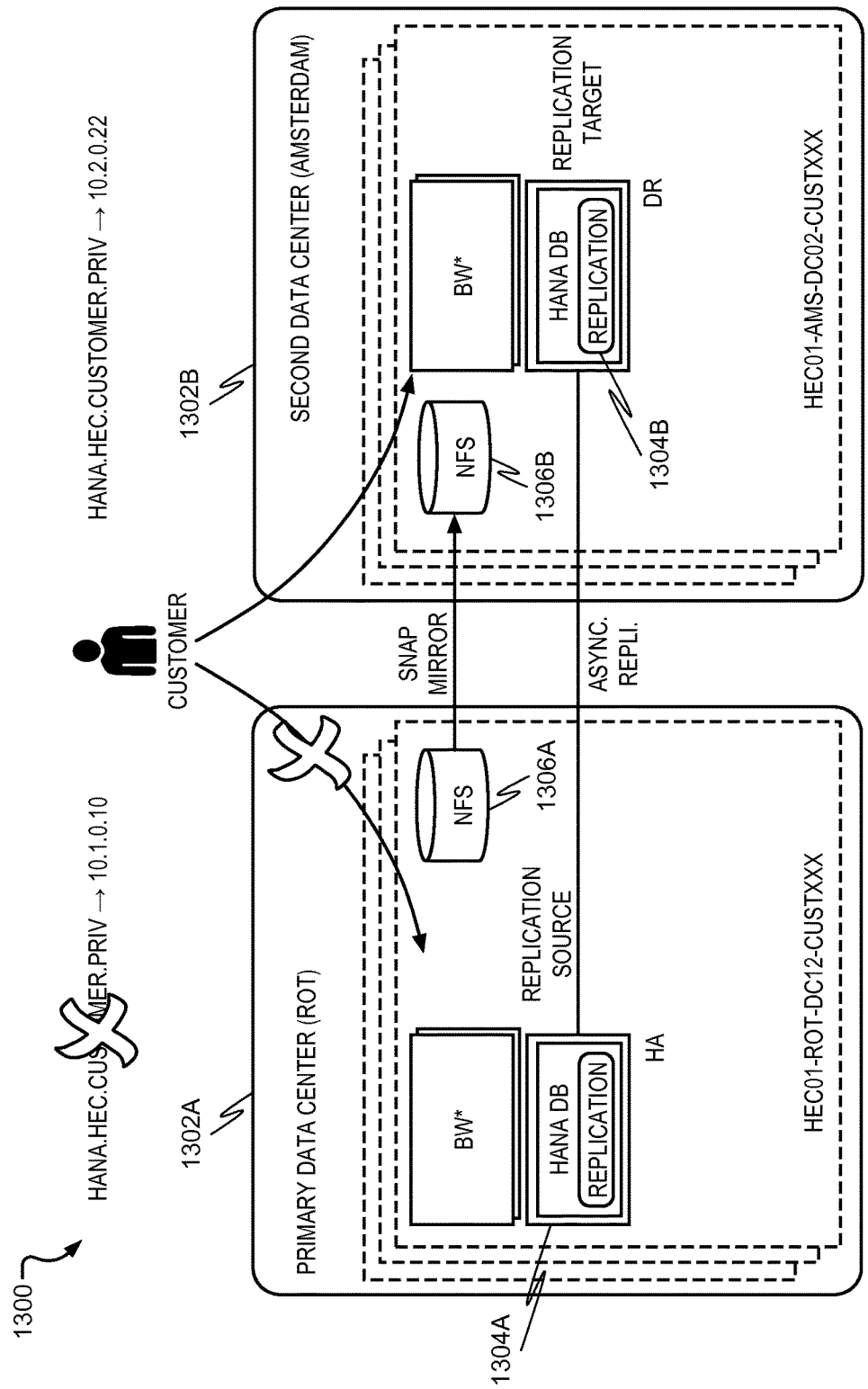
FIG. 13 is a block diagram illustrating a system for disaster recovery in an in-memory database environment, in accordance with an example embodiment.

Turning now to disaster recovery in an in-memory database environment, there may be a dedicated in-memory database scale-out cluster setup on a secondary management network (data center). As outlined previously, this secondary management network may have its own network segment with its own network address range and domain name. FIG. 13 is a block diagram illustrating a system 1300 for disaster recovery in an in-memory database environment, in accordance with an example embodiment. A primary data center 1302A and a secondary data center 1302B are shown. Each of one or more in-memory databases 1304A in the primary data center 1302A is connected with a corresponding in-memory database 1304B in the secondary data center 1302B, excluding perhaps a standby server (used for high availability) which for cost optimization purposes may only exist in the primary data center 1302A. Likewise an NFS 1306A in the primary data center 1302A is connected to an NFS 1306B in the secondary data center 1302B.

Figure 14:
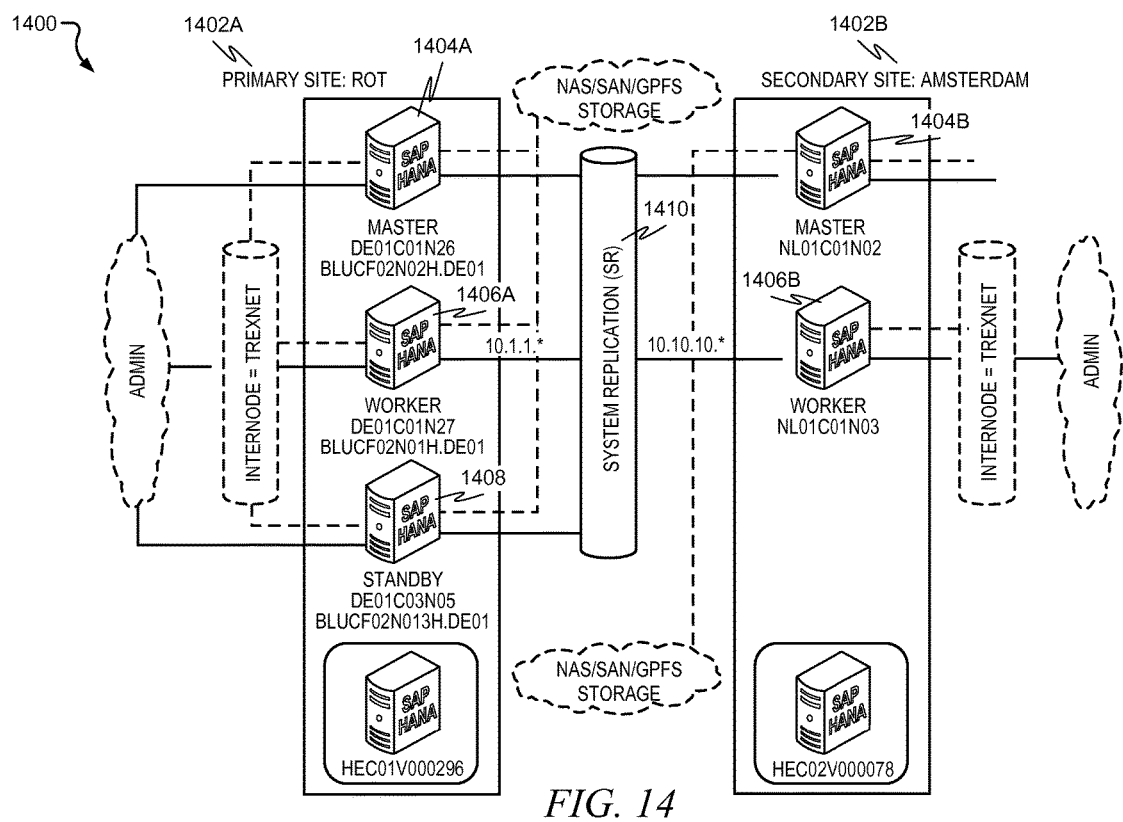
FIG. 14 is a block diagram illustrating a system for disaster recovery in an in-memory database environment, in accordance with another example embodiment.

FIG. 14 is a block diagram illustrating a system 1400 for disaster recovery in an in-memory database environment, in accordance with another example embodiment. The system 1400 includes a primary data center 1402A and a secondary data center 1402B. The primary data center 1402A may have a master node 1404A, a worker node 1406A, and a standby node 1408. The secondary data center 1402B may have a master node 1404B and a worker node 1406B. System replication 1410 occurs between the master nodes 1404A, 1404B and also between the worker nodes 1406A, 1406B.

As long as replication is switched on, the replication target (data recovery site) is monitored via the replication source (primary or active site) Replication status may also be displayed in the central management tools such as the central system monitoring component.

Figure 15:
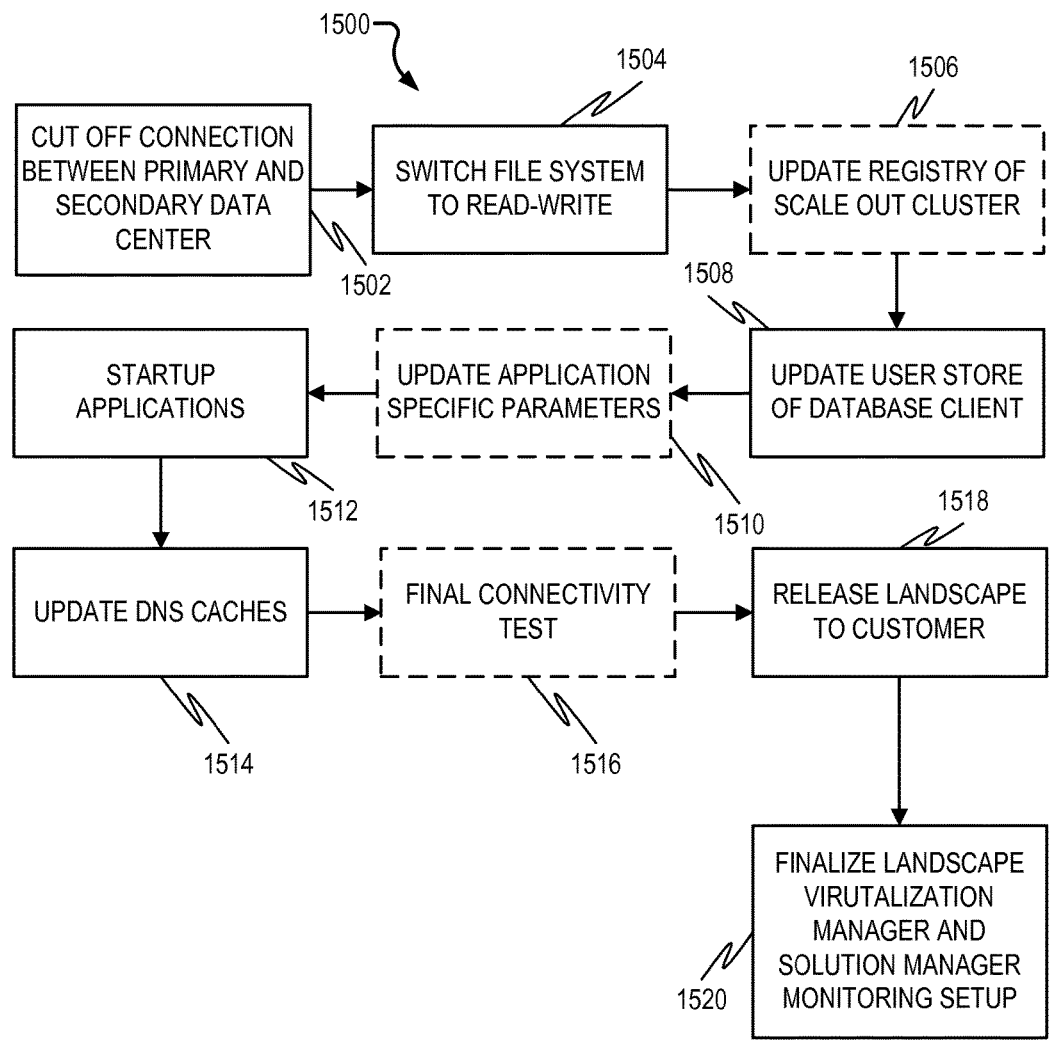
FIG. 15 is a flow diagram illustrating a method for performing disaster recovery in a computer network, in accordance with an example embodiment.

FIG. 15 is a flow diagram illustrating a method 1500 for performing disaster recovery in a computer network, in accordance with an example embodiment. Dashed lines indicate optional elements. This method may be performed when a disaster in a primary data center is detected. At operation 1502, a connection between the primary and secondary data centers may be cut off. This operation may be performed by, for example, an integrated scenario of the central system management tool (or landscape virtualization manager) and the central infrastructure management tool (or the technical infrastructure controller 112) of FIG. 1. The flow of sequence is the following: Systems on primary side are down in disaster, the landscape virtualization manager performs the switch to the data recovery site by making the respective database on the data recovery site the active one. Afterwards it cuts off the connection by cutting the snap mirror and by failing over the customer data center cross domain access point to the data recovery (now primary) data center site and its dc specific domain. After that, business application specifics are updated such as any data center specific parameter (e.g. FQDNs in the host profile). However this is reduced to a minimum as any external connection point between the applications as well as the connection between the application and the database already uses node independent client addresses (DB layer) or cross-data center hostnames (application layer). Cutting off the connection may include, for example, stopping replication or mirroring of any databases or data stores between the primary data center and the secondary data center.

At operation 1504, the file system may be switched to read-write. This operation may be performed by, for example, the infrastructure controller 112 of FIG. 1 orchestrated by the Landscape Virtualization Manager. At operation 1506, registration of an in-memory scale-out cluster to become primary gets performed. This operation may be performed by, for example, the landscape virtualization manager 110 of FIG. 1. At operation 1508, application specific parameters (e.g. FQDN in host profile) may be updated. This operation may be performed by, for example, the landscape virtualization manager 110 of FIG. 1.

At operation 1510, application specific parameters may optionally be updated. This operation may be performed by, for example, the landscape virtualization manager 110 of FIG. 1. At operation 1512, applications may be started up. This operation may be performed by, for example, the landscape virtualization manager 110 of FIG. 1. At operation 1514, the DNS caches can be updated. This operation may be performed by, for example, the technical infrastructure manager orchestrated by the LVM 110 of FIG. 1.

At operation 1516, a final connectivity test may optionally be performed. At operation 1518, the landscape may be released to the customer. Both are manual activities. At operation 1520, the landscape virtualization manager and solution manager monitoring setup can be finalized. This operation may be performed by, for example, the landscape virtualization manager 110 of FIG. 1.

Figure 16:
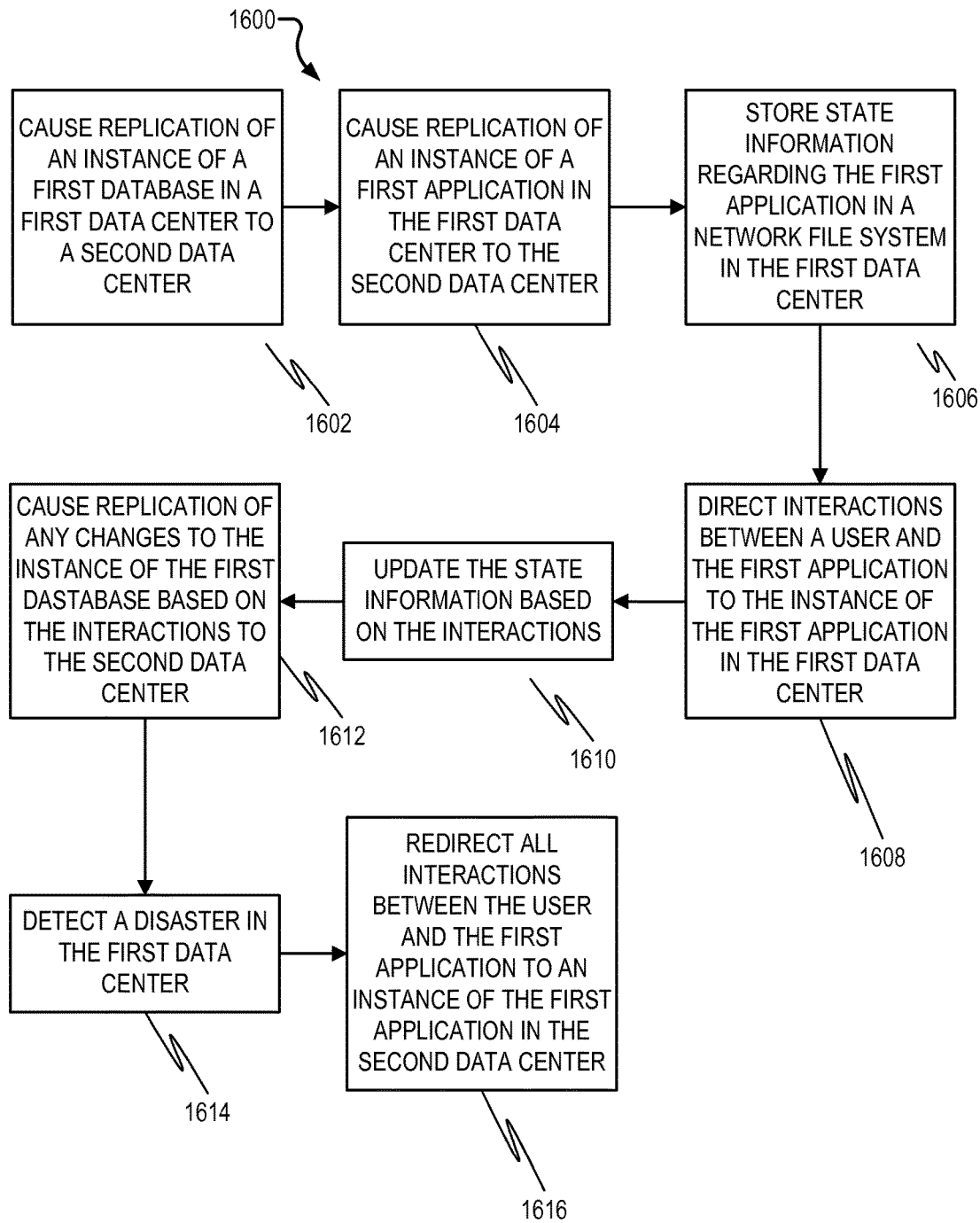
FIG. 16 is a flow diagram illustrating a method, in accordance with an example embodiment.

FIG. 16 is a flow diagram illustrating a method 1600, in accordance with an example embodiment. At operation 1602, replication of an instance of a first database in a first data center of a managed cloud to a second data center of the managed cloud is caused. At operation 1604, replication of an instance of a first application in the first data center to the second data center is caused. At operation 1606, state information regarding the first application is stored in a network file system in the first data center.

At operation 1608, interactions between a user and the first application are directed to the instance of the first application in the first data center. This may include using access control parameters stored by an infrastructure controller in a cloud integration component, the access control parameters defining an access control policy for the user. At operation 1610, the state information is updated based on the interactions. At operation 1612, replication to the second data center of any changes to the instance of the first database based on the interactions is caused.

At operation 1614, a disaster in the first data center is detected. At operation 1616, in response to the detecting of the disaster, all interactions between the user and the first application are redirected to an instance of the first application in the second data center caused by the replication of the first application. This may include using the access control parameters. Specifically, the access control parameters can include a domain that is to be used when the user attempts to interact with the first application, and these access control parameters can be modified to update the domain to match the domain of the second data center.

Example Mobile Device

Figure 17:
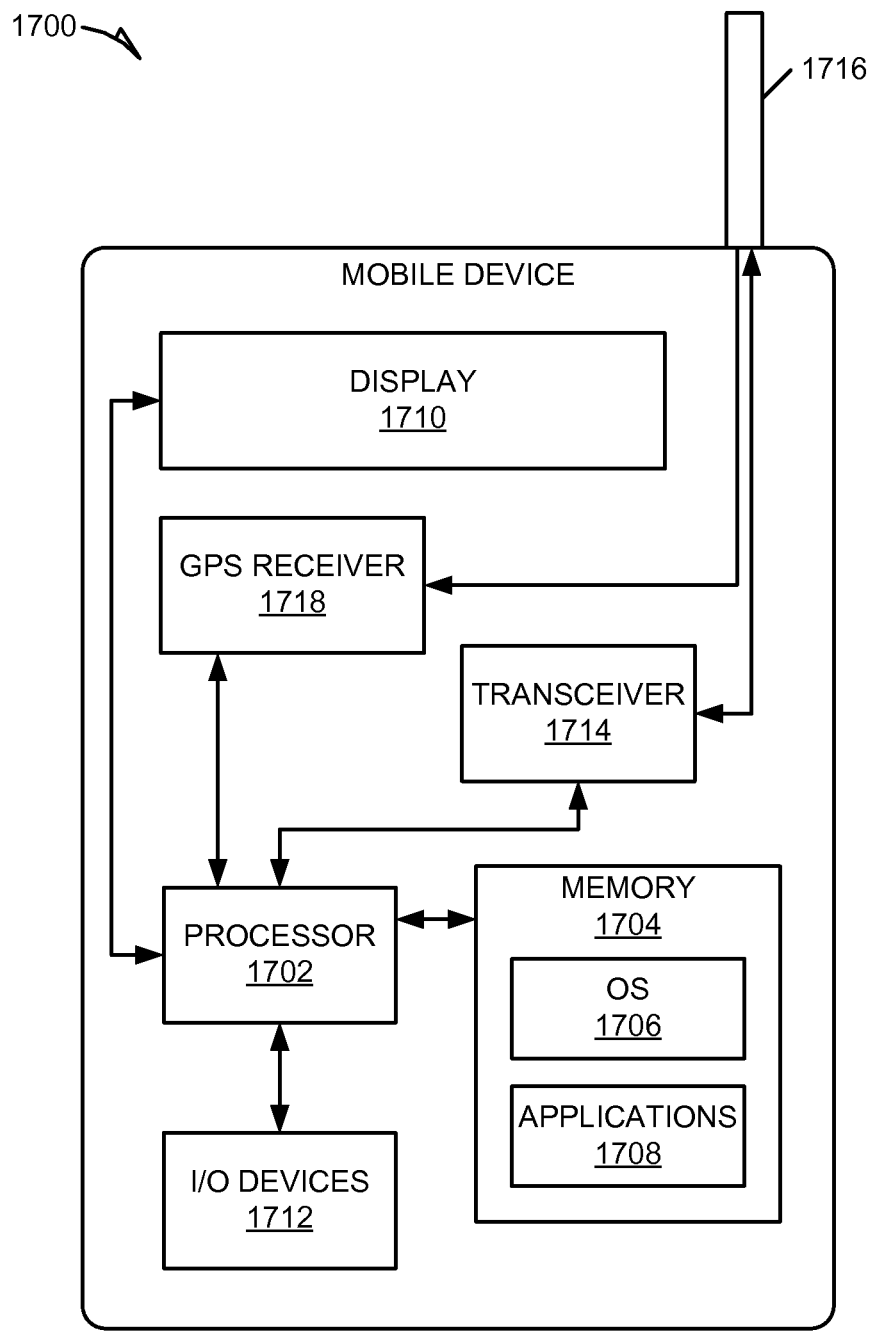
FIG. 17 is a block diagram illustrating a mobile device, according to an example embodiment.

FIG. 17 is a block diagram illustrating a mobile device 1700, according to an example embodiment. The mobile device 1700 may include a processor 1702. The processor 1702 may be any of a variety of different types of commercially available processors 1702 suitable for mobile devices 1700 (for example, an XScale architecture microprocessor, a microprocessor without interlocked pipeline stages (MIPS) architecture processor, or another type of processor 1702). A memory 1704, such as a random access memory (RAM), a flash memory, or another type of memory, is typically accessible to the processor 1702. The memory 1704 may be adapted to store an operating system (OS) 1706, as well as application programs 1708, such as a mobile location enabled application that may provide location-based services to a user. The processor 1702 may be coupled, either directly or via appropriate intermediary hardware, to a display 1710 and to one or more input/output (I/O) devices 1712, such as a keypad, a touch panel sensor, a microphone, and the like. Similarly, in some embodiments, the processor 1702 may be coupled to a transceiver 1714 that interfaces with an antenna 1716. The transceiver 1714 may be configured to both transmit and receive cellular network signals, wireless data signals, or other types of signals via the antenna 1716, depending on the nature of the mobile device 1700. Further, in some configurations, a GPS receiver 1718 may also make use of the antenna 1716 to receive GPS signals.

Connection for this mobile device to the disaster recovery site would follow the same principles than for an customer on-premise or an third party/Internet application Modules, Components and Logic Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors (e.g., processor 1702) may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications among such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments, the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application programming interfaces (APIs)).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 18:
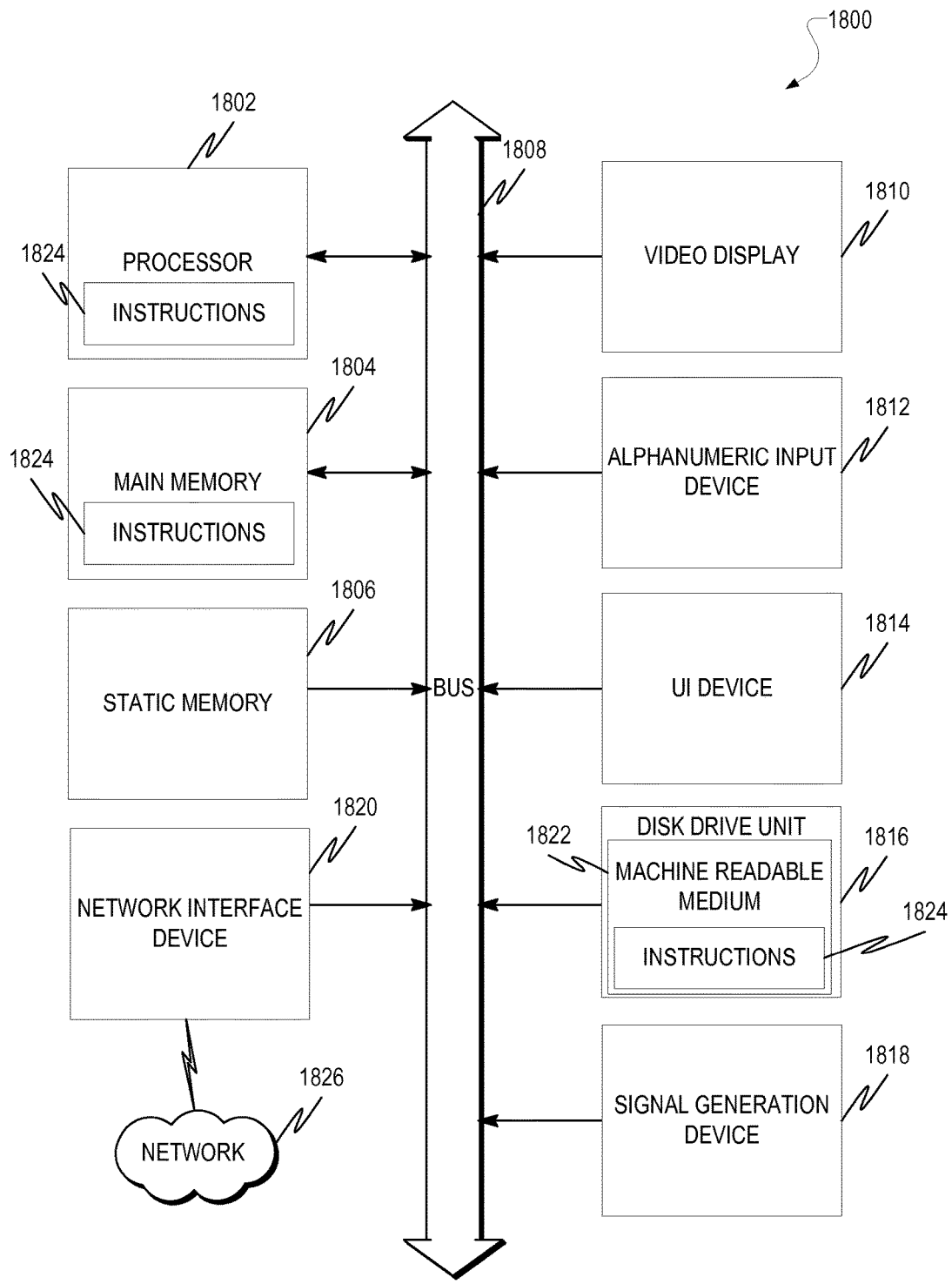
FIG. 18 is a block diagram of machine in the example form of a computer system within which instructions may be executed for causing the machine to perform any one or more of the methodologies discussed herein.

FIG. 18 is a block diagram of machine in the example form of a computer system 1800 within which instructions 1824 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU), or both), a main memory 1804, and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard or a touch-sensitive display screen), a user interface (UI) navigation (or cursor control) device 1814 (e.g., a mouse), a disk drive unit 1816, a signal generation device 1818 (e.g., a speaker), and a network interface device 1820.

Machine-Readable Medium

The disk drive unit 1816 includes a machine-readable medium 1822 on which is stored one or more sets of data structures and instructions 1824 (e.g., software) embodying or utilized by any one or more of the methodologies or functions described herein. The instructions 1824 may also reside, completely or at least partially, within the main memory 1804 and/or within the processor 1802 during execution thereof by the computer system 1800, with the main memory 1804 and the processor 1802 also constituting machine-readable media 1822.

While the machine-readable medium 1822 is shown in an example embodiment to be a single medium, the term "machine-readable medium" may include a single medium or multiple media (e.g., a centralized or distributed database, and/or associated caches and servers) that store the one or more instructions 1824 or data structures. The term "machine-readable medium" shall also be taken to include any tangible medium that is capable of storing, encoding, or carrying instructions 1824 for execution by the machine and that cause the machine to perform any one or more of the methodologies of the present disclosure, or that is capable of storing, encoding, or carrying data structures utilized by or associated with such instructions 1824. The term "machine-readable medium" shall accordingly be taken to include, but not be limited to, solid-state memories, and optical and magnetic media. Specific examples of machine-readable media 1822 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1824 may further be transmitted or received over a communications network 1826 using a transmission medium. The instructions 1824 may be transmitted using the network interface device 1820 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying the instructions 1824 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
    causing replication of an instance of a first database in a first data center of a managed cloud of a particular customer network to a second data center of the managed cloud of the particular customer network;
    causing mirroring of an instance of a first application in the first data center to the second data center, thereby replicating completely any application setup and/or file system structure to the second data center;
    storing state information regarding the first application in a network file system in the first data center;
    directing interactions between a user and the first application to the instance of the first application in the first data center;
    updating the state information based on the interactions, the updating being performed on a database level as well as on an application-specific repository level;
    causing replication to the second data center of any changes to the instance of the first database based on the interactions;
    causing replication to the second data center of any changes to an instance of the first Application specific repository level based on the interactions;
    detecting a disaster in the first data center; and
    in response to the detecting of the disaster, redirecting all interactions between the user and the first application to a second instance of the first application in the second data center caused by the replication of the instance of the first application in the first data center, after making them the primary once in the course of the failover, wherein the method is performed during business operations of the first data center, thus allowing continuous disaster recovery testing without business interruption.

2. The method of claim 1, further comprising:
    validating disaster recovery setup of the first and second data centers by simulating the method with an ability to failback to the first data center by redirecting user access back to the first data center.

3. The method of claim 1, wherein the directing interactions and the redirecting interactions are based on access control parameters stored by an infrastructure controller in a cloud integration component.

4. The method of claim 3, wherein the redirecting comprises altering the access control parameters to change a domain associated with the first application to match a domain of the second data center.

5. The method of claim 1, wherein the first database is an in-memory database.

6. The method of claim 5, wherein the instance of the first database in the first data center is stored as a first sub-instance of the first database in a first server in the first data center and as a second sub-instance of the first database in a second server in the first data center, wherein the second server is located on a separate and distinct hardware device from the first server.

7. The method of claim 6, wherein the network file system acts as a shared file system between the first server and the second server and is synchronized to a second network file system in the second data center.

8. A system comprising:
    a managed cloud comprising:
        a first data center comprising:
            a first server comprising:
                a first instance of a first database; and
                a first instance of a first application; and
            a network file system; and
        a second data center comprising:
            a second server comprising:
                a second instance of the first database; and
                a second instance of the first application; and
            a mirrored copy of the network file system; and
        a cloud integration component executable by one or more processors and comprising:
            a system management component configured to own a meta model for systems in a disaster recovery setup and its replication source and target, orchestrate overall disaster recovery procedures for disaster recovery readiness checks, failover, failback, and/or build, and cause replication of the first instance of the first database to the second instance of the first database;
        an infrastructure controller configured to:
            cause replication of the first instance of the first application to the second instance of the first application, the first instance of the first application configured to store state information regarding the first application in the network file system;
            direct interactions between a user and the first application to the first instance of the first application, the first instance of the first application further configured to update the state information based on the interactions;
            cause replication to the second instance of the first database of any changes to the first instance of the first database based on the interactions;
            detect a disaster in the first data center; and
            in response to the detecting of the disaster, redirect all interactions between the user and the first application to the second instance of the first application in the second data center, wherein infrastructure controller performs the redirecting during business operations of the first data center, thus allowing continuous disaster recovery testing without business interruption.

9. The system of claim 8, wherein the cloud integration component further comprises:
    a monitoring infrastructure configured to monitor the first data center and provide alerts based on the monitoring.

10. The system of claim 9, further comprising a landscape virtualization manager providing a user interface for one or more administrators to set up the instances of the first database and the instances of the first application in the first and second data centers.

11. The system of claim 10, wherein the landscape virtualization manager provides instructions and automatic procedures to the infrastructure controller as well as the managed systems/customer solutions to how to react to the detection of the disaster in the first data center.

12. The system of claim 11, wherein the instructions include instructions on attempting to restart the first instance of the first application in the first data center after the disaster occurs, the instructions providing a plurality of different actions based on a plurality of different alerts (among other from the solution manager) orchestrated within the system management component.

13. A non-transitory machine-readable storage medium comprising instructions, which when implemented by one or more machines, cause the one or more machines to perform operations comprising:
  causing replication of an instance of a first database in a first data center of a managed cloud to a second data center of the managed cloud;
  causing replication of an instance of a first application in the first data center to the second data center;
  storing state information regarding the first application in a network file system in the first data center;
  directing interactions between a user and the first application to the instance of the first application in the first data center;
  updating the state information based on the interactions;
  causing replication to the second data center of any changes to the instance of the first database based on the interactions;
  detecting a disaster in the first data center; and
  in response to the detecting of the disaster, redirecting all interactions between the user and the first application to a second instance of the first application in the second data center caused by the replication of the instance of the first application in the first data center, wherein the operations are performed during business operations of the first data center, thus allowing continuous disaster recovery testing without business interruption.

14. The non-transitory machine-readable storage medium of claim 13, wherein the directing interactions and the redirecting interactions are based on access control parameters stored by an infrastructure controller in a cloud integration component.

15. The non-transitory machine-readable storage medium of claim 14, wherein the redirecting comprises altering the access control parameters to change a domain associated with the first application to match a domain of the second data center.

16. The non-transitory machine-readable storage medium of claim 13, wherein the first database is an in-memory database.

17. The non-transitory machine-readable storage medium of claim 16, wherein the instance of the first database in the first data center is stored as a first sub-instance of the first database in a first server in the first data center and as a second sub-instance of the first database in a second server in the first data center, wherein the second server is located on a separate and distinct hardware device from the first server.

18. The non-transitory machine-readable storage medium of claim 17, wherein the first server includes a first name server, a first index server, and a first statistics server, while the second server includes a second name server and a second index server but does not include a second statistics server.

19. The non-transitory machine-readable storage medium of claim 17, wherein the network file system acts as a shared file system between the first server and the second server and is synchronized to a second network file system in the second data center.

* * * * *